(12) United States Patent
Cheng

(10) Patent No.: US 11,487,321 B2
(45) Date of Patent: Nov. 1, 2022

(54) FOLDABLE ELECTRONIC DEVICE

(71) Applicant: GUANGDONG OPPO MOBILE TELECOMMUNICATIONS CORP., LTD., Guangdong (CN)

(72) Inventor: Jiao Cheng, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 34 days.

(21) Appl. No.: 17/122,520

(22) Filed: Dec. 15, 2020

(65) Prior Publication Data

US 2021/0096596 A1 Apr. 1, 2021

Related U.S. Application Data

(63) Continuation of application No. PCT/CN2019/091476, filed on Jun. 17, 2019.

(30) Foreign Application Priority Data

Jul. 13, 2018 (CN) .......................... 201810771865.6
Jul. 13, 2018 (CN) .......................... 201821113668.7

(51) Int. Cl.
 *G06F 1/16* (2006.01)
(52) U.S. Cl.
 CPC .......... *G06F 1/1616* (2013.01); *G06F 1/1641* (2013.01); *G06F 1/1652* (2013.01); *G06F 1/1681* (2013.01)
(58) Field of Classification Search
 CPC combination set(s) only.
 See application file for complete search history.

(56) References Cited

U.S. PATENT DOCUMENTS 9,348,450 B1 * 5/2016 Kim ...................... G06F 1/1616
10,901,464 B2 * 1/2021 Seo ........................ G06F 1/1652
(Continued)

FOREIGN PATENT DOCUMENTS

CN    104506688 A    4/2015
CN    204331666 U    5/2015
(Continued)

OTHER PUBLICATIONS

Extended European search report for EP Application No. 19833149.8 dated Jul. 7, 2021 (11 pages).
(Continued)

*Primary Examiner* — Lisa Lea-Edmonds
(74) *Attorney, Agent, or Firm* — Young Basile Hanlon & MacFarlane, P.C.

(57) ABSTRACT

The present disclosure relates to a foldable electronic device. The foldable electronic device may include a shaft bracket, a first housing and a second housing, a flexible panel and a guiding member. The shaft bracket may include a base plate, a first side plate and a second side plate. The base plate, the first side plate and the second side plate may define an accommodation space. The flexible panel may include a first region, a middle region and a second region integrated together. The middle region may be arranged corresponding to the base plate of the shaft bracket. The guiding member may be arranged between the middle region of the flexible panel and the shaft bracket, and may be configured to apply a guiding force towards the accommodation space of the shaft bracket to the middle region of the flexible panel.

20 Claims, 6 Drawing Sheets

(56) References Cited

U.S. PATENT DOCUMENTS

| | | | | |
|---|---|---|---|---|
| 11,137,801 B2* | 10/2021 | Park | ................. | G06F 1/1635 |
| 2015/0233162 A1* | 8/2015 | Lee | ................. | H04M 1/02 |
| | | | | 16/223 |
| 2020/0081495 A1* | 3/2020 | Lin | ................. | H04M 1/022 |
| 2021/0141422 A1* | 5/2021 | Seo | ................. | G06F 1/1652 |
| 2022/0019266 A1* | 1/2022 | Park | ................. | G06F 1/1616 |

FOREIGN PATENT DOCUMENTS

| | | |
|---|---|---|
| CN | 206547121 U | 10/2017 |
| CN | 105611006 B | 3/2018 |
| CN | 208609020 U | 3/2019 |

OTHER PUBLICATIONS

International search report with English Translation for PCT/CN2019/091476, dated Sep. 4, 2019 (11 pages).

* cited by examiner

FOLDABLE ELECTRONIC DEVICE

CROSS-REFERENCE TO RELATED APPLICATION(S)

The present application is a continuation-application of International (PCT) Patent Application No. PCT/CN2019/091476 filed on Jun. 17, 2019, which claims priorities to Chinese Patent Application No. 201810771865.6, filed on Jul. 13, 2018 and Chinese Patent Application No. 201821113668.7, filed on Jul. 13, 2018, the entire contents of all of which are hereby incorporated by reference in their entireties.

TECHNICAL FIELD

The present disclosure relates to a technical field of an electronic device, and more particularly to a foldable electronic device.

BACKGROUND

A flexible panel represents a trend in future mobile electronic products. Some literatures have described that a flexible panel being applied to an electronic device to form a foldable electronic device, thus the electronic device may have a changeable form, thereby improving portability of the electronic device. For one type of foldable electronic device, when in the folded state, the flexible panel is located inside the electronic device. In order to facilitate folding of the flexible panel, an accommodation space needs to be reserved at the middle position inside the electronic device. The middle position of the flexible panel is located in the accommodation space after the flexible panel is folded. The middle position of the flexible panel cannot be fixed, otherwise a switch between the folded state and the unfolded state may be hindered. However, in the initial stage of a process during which the flexible panel switches from the unfolded state to the folded state, a movement trend of the middle position of the flexible panel is not definite. The middle position of the flexible panel may be very likely to bend and deform along a direction away from the accommodation space, which may left a force experienced by the flexible panel unpredictable and the flexible panel may further be damaged.

SUMMARY

According to one aspect of the present disclosure, a foldable electronic device is provided. The shaft bracket may include a base plate, a first side plate and a second side plate. The first side plate may be connected to one side of the base plate. The second side plate may be connected to another side of the base plate and opposite to the first side plate. The base plate. The first side plate and the second side plate may define an accommodation space. The first housing may be rotatably connected to the first side plate. The second housing may be rotatably connected to the second side plate. The first housing and the second housing may be capable of rotating around the shaft bracket between an unfolded state and a folded state. The flexible panel may include a first region, a middle region and a second region integrated together. The first region may be coupled with the first housing. The second region may be coupled with the second housing. The middle region may be arranged corresponding to the base plate of the shaft bracket. The guiding member may be arranged between the middle region of the flexible panel and the shaft bracket, and may be configured to apply a guiding force towards the accommodation space of the shaft bracket to the middle region of the flexible panel.

According to a second aspect of the present disclosure, a foldable electronic device is provided. The foldable electronic device may include a shaft bracket, a housing assembly, a flexible panel and a guiding member. The shaft bracket may define an accommodation space. The housing assembly may include a first housing and a second housing. Both the first housing and the second housing may be connected to the shaft bracket, and configured to rotate relative to the shaft bracket to switch between an unfolded state and a folded state. The flexible panel may include a first region, a middle region and a second region integrated together. The middle region may be located between the first region and the second region. The first region may be connected to the first housing. The second region may be connected to the second housing. The guiding member may be arranged between the middle region of the flexible panel and the shaft bracket, configured to apply a guiding force towards the accommodation space of the shaft bracket to the middle region of the flexible panel.

According to a third aspect of the present disclosure, a foldable electronic device is provided. The shaft bracket may define an accommodation space. Both the first housing and the second housing may be connected to the shaft bracket, and capable of rotating relative to the shaft bracket to switch between an unfolded state and a folded state. The flexible panel may include a first region, a middle region and a second region integrated together. The middle region may be located between the first region and the second region. The first region may be connected to the first housing. The second region may be connected to the second housing. The moveable plate may be arranged in the accommodation space and connected to the shaft bracket. When the foldable electronic device switches from the unfolded state to the folded state, the moveable plate may be configured to move in the accommodation space along a direction away from the middle region. When the foldable electronic device switches from the folded state to the unfolded state, the moveable plate may be configured to move in the accommodation space along a direction towards the middle region and support the middle region. The guiding member may include a magnetic attraction member and a magnetic member. The magnetic attraction member may be arranged on one of the moveable plate and the middle region. The magnetic member may be arranged on the other one of the movable plate and the middle region. The magnetic attraction member and the magnetic member may be configured to be attracted to each other to connect the middle region and the movable plate. The middle region may be capable of moving with a movement of the moveable plate.

BRIEF DESCRIPTION OF DRAWINGS

In order to more clearly illustrate technical solutions of the present disclosure or the prior art, drawings required in the description of the embodiments or the prior art will be briefly introduced below. Obviously, the drawings in the following description are only some embodiments of the present disclosure. For those of ordinary skills in the art, other drawings could be obtained based on these drawings without creative efforts.

DETAILED DESCRIPTION

Figure 1:
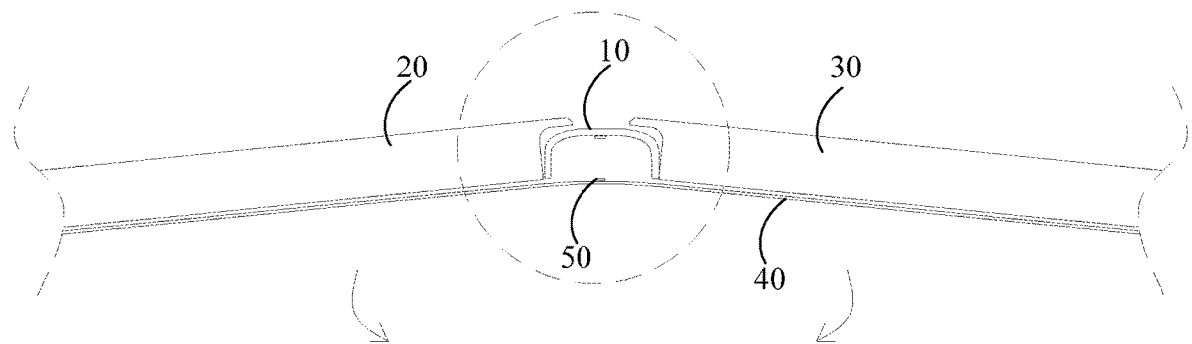
FIG. 1 is a schematic structural diagram of a foldable electronic device when being switched from an unfolded state to a folded state according to an embodiment of the present disclosure.

In some embodiments, a foldable electronic device may include a shaft bracket, a first housing and a second housing, a flexible panel and a guiding member. The shaft bracket may include a base plate, a first side plate and a second side plate. The first side plate may be connected to one side of the base plate. The second side plate may be connected to another side of the base plate and opposite to the first side plate. The base plate. The first side plate and the second side plate may define an accommodation space. The first housing may be rotatably connected to the first side plate. The second housing may be rotatably connected to the second side plate. The first housing and the second housing may be capable of rotating around the shaft bracket between an unfolded state and a folded state. The flexible panel may include a first region, a middle region and a second region integrated together. The first region and the first housing may be coupled. The second region and the second housing may be coupled. The middle region may be arranged corresponding to the base plate of the shaft bracket. The guiding member may be arranged between the middle region of the flexible panel and the shaft bracket, and may be configured to apply a guiding force towards the accommodation space of the shaft bracket to the middle region of the flexible panel.

In some embodiments, the guiding member may include an elastic member. One end of the elastic member may be connected to the shaft bracket, another end of the elastic member may be connected to the middle region of the flexible panel. The elastic member may be configured to generate a pulling force that causes the flexible panel to move towards the accommodation space of the shaft bracket.

In some embodiments, the foldable electronic device may include a moveable plate connected to the shaft bracket. The moveable plate may be arranged in the accommodation space. When the foldable electronic device switches from the unfolded state to the folded state, the moveable plate may be configured to move towards the base plate of the shaft bracket. When the foldable electronic device switches from the folded state to the unfolded state, the moveable plate may be configured to move towards the flexible panel and may be configured to support the middle region of the flexible panel.

In some embodiments, a passage may be defined in the moveable plate for the elastic member to pass through.

In some embodiments, the guiding member may include a magnetic attraction member and a magnetic member. The magnetic attraction member may be arranged on one of the middle region of the flexible panel and the shaft bracket. The magnetic member may be arranged on the other one of the middle region of the flexible panel and the shaft bracket.

In some embodiments, the magnetic attraction member may be arranged on a bottom of the accommodation space of the shaft bracket. The magnetic member may be arranged on a back surface of the middle region of the flexible panel.

In some embodiments, the foldable electronic device may include a moveable plate connected to the shaft bracket. The moveable plate may be arranged in the accommodation space. When the foldable electronic device switches from the unfolded state to the folded state, the moveable plate may be configured to move towards the base plate of the shaft bracket. When the foldable electronic device switches from the folded state to the unfolded state, the moveable plate may be configured to move towards the flexible panel and may be configured to support the middle region of the flexible panel.

In some embodiments, the guiding member may include an elastic member. One end of the elastic member may be connected to the shaft bracket, another end of the elastic member may be connected to the middle region of the flexible panel. The elastic member may be configured to generate a pulling force that causes the flexible panel to move towards the accommodation space of the shaft bracket. A passage may be defined in the moveable plate for the elastic member to pass through.

In some embodiments, the guiding member may include a magnetic attraction member and a magnetic member. The magnetic attraction member may be arranged on one of the middle region of the flexible panel and the moveable plate. The magnetic member may be arranged on the other one of the middle region of the flexible panel and the moveable plate.

In some embodiments, the moveable plate may include a first surface facing the flexible panel and a second surface facing away from the flexible panel. The guiding member may include a magnetic attraction member and a magnetic member. The magnetic attraction member may be arranged on the second surface of the moveable plate. The magnetic member may be arranged on a back surface of the middle region of the flexible panel.

In some embodiments, the foldable electronic device may include a moveable plate arranged in the accommodation space. Two posts may be arranged on an end of the moveable plate. A first rotating arm matching with one of the two posts may be arranged on the first housing. A second rotating arm matching with the other one of the two posts may be arranged on the second housing. When the foldable electronic device switches from the unfolded state to the folded state, the first rotating arm and the second rotating arm may be configured to drive the moveable plate to move towards the base plate of the shaft bracket. When the foldable electronic device switches from the folded state to the unfolded state, the first rotating arm and the second rotating arm may be configured to drive the moveable plate to move towards the flexible panel, and may be configured to support the middle region of the flexible panel.

In some embodiments, the shaft bracket may include two end plates connecting at two opposite ends of the base plate respectively. Each of the two end plates may define two guiding grooves. One of the two posts may pass through one of the two guiding grooves and then match with the first rotating arm. The other one of the two posts may pass through the other one of the two guiding grooves and then match with the second rotating arm.

In some embodiments, the foldable electronic device may include a fixing plate and a gear train arranged on the fixing plate. The fixing plate may be arranged on one of the two end plates. The first rotating arm and the second rotating arm may be located between the fixing plate and the end plate provided with the fixing plate. The gear train may include a first gear, a second gear and an intermediate gear meshing between the first and the second gear. A gear shaft of the first gear may pass through the fixing plate and then may be connected to the first rotating arm for transmission. A gear shaft of the second gear may pass through the fixing plate and then may be connected to the second rotating arm for transmission.

In some embodiments, the foldable electronic device may include a stop block. The stop block may be arranged on the fixing plate and configured to limit a rotating range of the first rotating arm and the second rotating arm.

In some embodiments, the shaft bracket may include a first intermediate plate and a second intermediate plate. One end of the first intermediate plate may be hinged to the first side plate. The other end of the first intermediate plate may be connected to the first rotating arm. One end of the second intermediate plate may be hinged to the second side plate. The other end of the second intermediate plate may be connected to the second rotating arm.

In some embodiments, a first tenon may be arranged on one of the first intermediate plate and the first rotating arm, a first groove may be defined by the other one of the first intermediate plate and the first rotating arm. The first intermediate plate and the first rotating arm may be connected to each other through a cooperation of the first tenon and the first groove. A second tenon may be arranged on one of the second intermediate plate and the second rotating arm, a second groove may be defined by the other one of the second intermediate plate and the second rotating arm. The second intermediate plate and the second rotating arm may be connected to each other through a cooperation of the second tenon and the second groove.

In some embodiments, a foldable electronic device may include a shaft bracket, a housing assembly, a flexible panel and a guiding member. The shaft bracket may define an accommodation space. The housing assembly may include a first housing and a second housing. Both the first housing and the second housing may be connected to the shaft bracket, and configured to rotate relative to the shaft bracket to switch between an unfolded state and a folded state. The flexible panel may include a first region, a middle region and a second region integrated together. The middle region may be located between the first region and the second region. The first region may be connected to the first housing. The second region may be connected to the second housing. The guiding member may be arranged between the middle region of the flexible panel and the shaft bracket, configured to apply a guiding force towards the accommodation space of the shaft bracket to the middle region of the flexible panel.

In some embodiments, the guiding member may include an elastic member. An end of the elastic member may be connected to the shaft bracket. Another end of the elastic member may be connected to the middle region. The elastic member may be configured to generate a pulling force to drive the flexible panel to move towards the accommodation space.

In some embodiments, the foldable electronic device may include a moveable plate. The moveable plate may be arranged in the accommodation space and connected to the shaft bracket. When the foldable electronic device switches from the unfolded state to the folded state, the moveable plate may be configured to move in the accommodation space along an direction away from the middle region. When the foldable electronic device switches from the folded state to the unfolded state, the moveable plate may be configured to move in the accommodation space along a direction towards the middle region and may be configured to support the middle region.

In some embodiments, two posts may be arranged on one end of the moveable plate. A first rotating arm matching with one of the two posts may be arranged on the first housing. A second rotating arm matching with the other one of the two posts may be arranged on the second housing. When the foldable electronic device switches from the unfolded state to the folded state, the first rotating arm and the second rotating arm may be configured to drive the moveable plate to move along a direction away from the middle region. When the foldable electronic device switches from the folded state to the unfolded state, the first rotating arm and the second rotating arm may be configured to drive the moveable plate to move along a direction towards the middle region, and may be configured to support the middle region.

In some embodiments, the foldable electronic device may include a moveable plate. The moveable plate may be arranged in the accommodation space and connected to the shaft bracket. When the foldable electronic device switches from the unfolded state to the folded state, the moveable plate may be configured to move in the accommodation space along an direction away from the middle region. When the foldable electronic device switches from the folded state to the unfolded state, the moveable plate may be configured to move in the accommodation space along a direction towards the middle region and may be configured to support the middle region. The guiding member may include a magnetic attraction member and a magnetic member. The magnetic attraction member may be arranged on one of the moveable plate and the middle region. The magnetic member may be arranged on the other one of the moveable plate and the middle region.

In some embodiments, two posts may be arranged on one end of the moveable plate. A first rotating arm matching with one of the two posts may be arranged on the first housing. A second rotating arm matching with the other one of the two posts may be arranged on the second housing. When the foldable electronic device switches from the unfolded state to the folded state, the first rotating arm and the second rotating arm may be configured to drive the moveable plate to move along a direction away from the middle region. When the foldable electronic device switches from the folded state to the unfolded state, the first rotating arm and the second rotating arm may be configured to drive the moveable plate to move along a direction towards the middle region, and may be configured to support the middle region.

In some embodiments, the shaft bracket further may include two end plates arranged on two opposite ends of the shaft bracket respectively. Each of the two end plates may define two guiding grooves. One of the two posts may pass through one of the two guiding grooves and match with the first rotating arm. The other one of the two posts may pass through the other one of the two guiding grooves and then match with the second rotating arm.

In some embodiments, a foldable electronic device may include a shaft bracket, a first housing and a second housing, a flexible panel, a moveable plate and a guiding member. The shaft bracket may define an accommodation space. Both the first housing and the second housing may be connected to the shaft bracket, and capable of rotating relative to the shaft bracket to switch between an unfolded state and a folded state. The flexible panel may include a first region, a middle region and a second region integrated together. The middle region may be located between the first region and the second region. The first region may be connected to the first housing. The second region may be connected to the second housing. The moveable plate may be arranged in the accommodation space and connected to the shaft bracket. When the foldable electronic device switches from the unfolded state to the folded state, the moveable plate may be configured to move in the accommodation space along an direction away from the middle region. When the foldable electronic device switches from the folded state to the unfolded state, the moveable plate may be configured to move in the accommodation space along a direction towards the middle region and support the middle region. The guiding member may include a magnetic attraction member and a magnetic member. The magnetic attraction member may be arranged on one of the moveable plate and the middle region. The magnetic member may be arranged on the other one of the movable plate and the middle region. The magnetic attraction member and the magnetic member may be configured to be attracted to each other to connect the middle region and the movable plate. The middle region may be capable of moving with a movement of the moveable plate.

In some embodiments, the guiding member may include a magnetic attraction member and a magnetic member. The magnetic attraction member may be arranged on one of the shaft bracket and the middle region. The magnetic member may be arranged on the other one of the shaft bracket and the middle region.

In some embodiments, the foldable electronic device may include a moveable plate arranged in the accommodation space. Two posts may be arranged on one end of the moveable plate. A first rotating arm matching with one of the two posts may be arranged on the first housing. A second rotating arm matching with the other one of the two posts may be arranged on the second housing. When the foldable electronic device switches from the unfolded state to the folded state, the first rotating arm and the second rotating arm may be configured to drive the moveable plate to move along a direction away from the middle region. When the foldable electronic device switches from the folded state to the unfolded state, the first rotating arm and the second rotating arm may be configured to drive the moveable plate to move along a direction towards the middle region, and may be configured to support the middle region.

In some embodiments, the shaft bracket further may include two end plates arranged on two opposite ends of the shaft bracket respectively. Each of the two end plates may define two guiding grooves. One of the two posts may pass through one of the two guiding grooves and match with the first rotating arm. The other one of the two posts may pass through the other one of the two guiding grooves and then match with the second rotating arm.

In some embodiments, the foldable electronic device may include a fixing plate and a gear train arranged on the fixing plate. The fixing plate may be arranged on one of the end plates. The first rotating arm and the second rotating arm may be located between the fixing plate and the end plate provided with the fixing plate. The gear train may include a first gear, a second gear and an intermediate gear meshing between the first gear and the second gear. A gear shaft of the first gear may pass through the fixing plate and then may be connected to the first rotating arm for transmission. A gear shaft of the second gear may pass through the fixing plate and then may be connected with the second rotating arm for transmission.

In order to facilitate understanding of the present disclosure, the present disclosure will be described more fully below with reference to the relevant drawings. The drawings show preferred embodiments of the present disclosure. However, the present disclosure may be implemented in many different forms and not limited to the embodiments described herein. On the contrary, the purpose of providing these embodiments is to make the understanding of the present disclosure more thorough and comprehensive.

As used herein, "terminal device" may include but be not limited to device that could receive and/or transmit communication signals and is connected via any one or several of the following connection ways:

(1) connection via wired lines, such as via Public Switched Telephone Networks (PSTN), Digital Subscriber Lines (DSL), digital cables, direct cable connections;

(2) connection via wireless interfaces, such as cellular networks, Wireless Local Area Networks (WLAN), digital TV networks such as DVB-H networks, satellite networks, AM-FM broadcast transmitters.

A terminal device arranged to communicate via a wireless interface may be referred to as a 'mobile terminal. Examples of mobile terminals may include but be not limited to the following electronic device:

(1) satellite phones or cellular phones;

(2) a Personal Communications System (PCS) terminal that can combine functions of a cellular radio telephone with data processing, fax and data communication capabilities;

(3) Radio telephones, pagers, Internet/Intranet accesses, Web browsers, notebooks, calendars, personal digital assistants (PDAs) equipped with Global Positioning System (GPS) receivers;

(4) Conventional laptops and/or palmtop receivers;

(5) Conventional laptops and/or palmtop radio telephone transceivers, etc.

Figure 2:
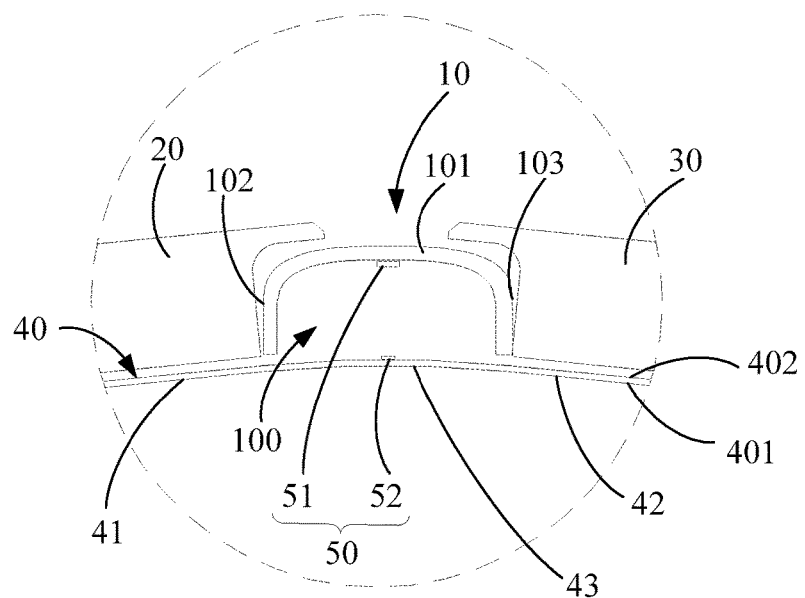
FIG. 2 is an enlarged schematic diagram of a portion circled in FIG. 1.

As is shown in FIG. 1 and FIG. 2, a foldable electronic device provided in some embodiments of the present disclosure may include a shaft bracket 10, a first housing 20, a second housing 30, a flexible panel 40 and a guiding member 50. The first housing 20 and the second housing 30 may be rotatably connected to the shaft bracket 10. When being driven by an external force, the first housing 20 and the second housing 30 could rotate around the shaft bracket 10. The flexible panel 40 may be coupled to the first housing 20 and the second housing 30, and could move with the first housing 20 and the second housing 30 to switch between a folded state and an unfolded state. In some embodiments, the flexible panel 40 may be attached to surfaces of the first housing 20 and the second housing 30 that are adjacent in the folded state. That is, when the foldable electronic device is in the folded state, the flexible panel 40 may be inside the electronic device. The guiding member 50 may be configured to apply a guiding force to the flexible panel 40. In the initial stage of a process during which the foldable electronic device switches from the unfolded state to the folded state, the guiding force may make a force experienced by a particular region of the flexible panel 40 definite, and force the flexible panel 40 to deform towards a predefined direction, thereby avoiding damage of the flexible panel 40.

The shaft bracket 10 may include a base plate 101, a first side plate 102 and a second side plate 103. The first side plate 102 and the second side plate 103 may connect to two opposite sides of the base plate 101. The base plate 101, the first side plate 102 and the second side plate 103 may define an accommodation space 100. The accommodation space 100 may be configured to accommodate part of the flexible panel 40 when the flexible panel 40 is in the folded state. The first side plate 102 may be configured to be rotatably connected to the first housing 20. The second side plate 103 may be configured to be rotatably connected to the second housing 30.

The shaft bracket 10 may have a single-shaft structure or a multi-shaft structure. In some embodiments, two hinge shafts hinged with each other could be arranged side-by-side on the shaft bracket 10. The first housing 20 may connect with one hinge shaft. The second housing 30 may connect with another hinge shaft. The first housing 20, the second housing 30 may be rotatably arranged on the shaft bracket 10 by means of corresponding hinge shafts.

The flexible panel 40 may be an OLED panel. The flexible panel 40 may include a front surface 401 and a back surface 402. The back surface 402 may be a surface facing the first housing 20, the second housing 30 and the shaft bracket 10. The front surface 401 may be a surface configured for display. The flexible panel 40 may include a first region 41, a middle region 43 and a second region 42 integrated together. The first region 41 may couple with the first housing 20. The second region 42 may couple with the second housing 30. The middle region 43 may be arranged corresponding to the base plate 101 of the shaft bracket 10. That is, a vertical projection of the middle region 43 may be in the base plate 101. The middle region 43 may not be fixedly connected to the first housing 20 and the second housing 30, so as to facilitate a switch between the folded state and the unfolded state.

Figure 3:
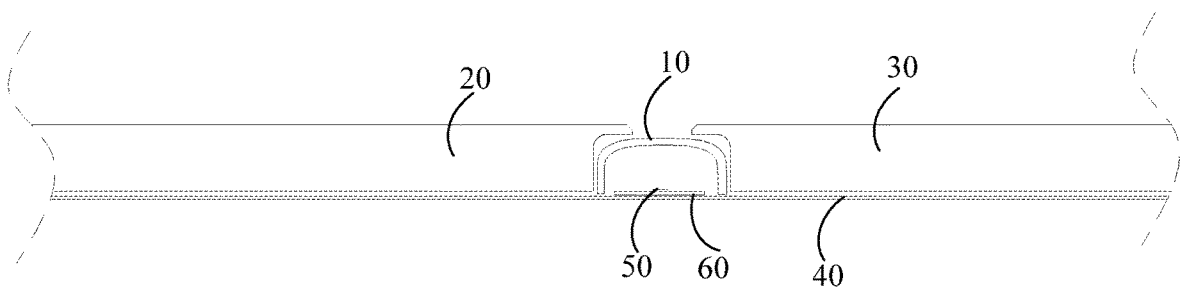
FIG. 3 is a schematic structural diagram of a foldable electronic device when being in the unfolded state according to another embodiment of the present disclosure.
Figure 4:
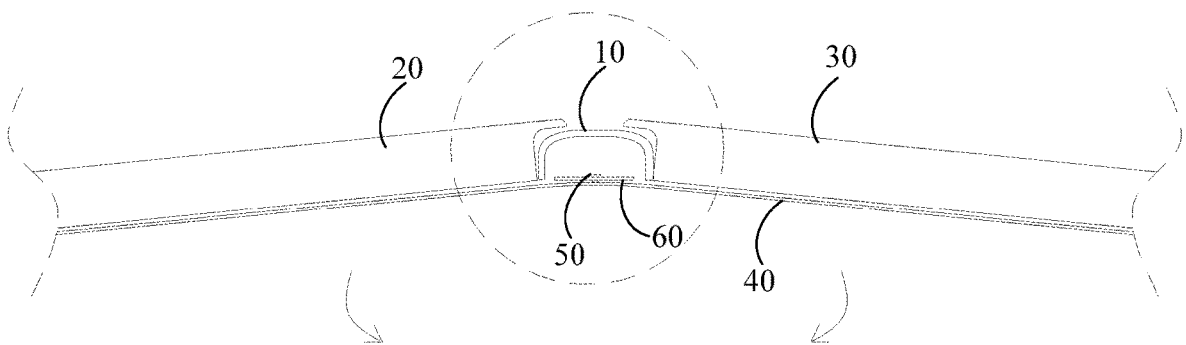
FIG. 4 is a schematic structural diagram of the foldable electronic device shown in FIG. 3 when being switched from the unfolded state to the folded state.
Figure 5:
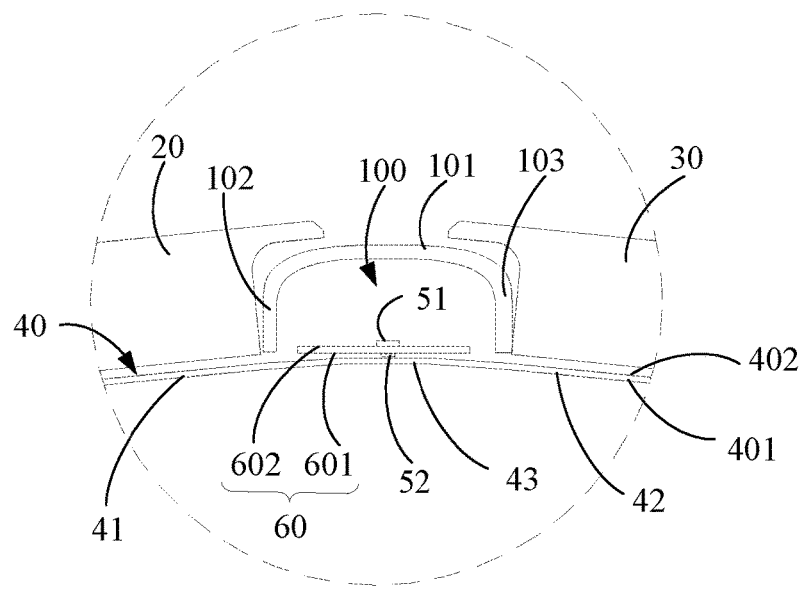
FIG. 5 is an enlarged schematic diagram of a portion circled in FIG. 4.

In some embodiments, as is shown in FIG. 3, FIG. 4 and FIG. 5, the foldable electronic device may further include a moveable plate 60 connected to the shaft bracket 10. The moveable plate 60 may be arranged in the accommodation space 100. When the foldable electronic device switches from the unfolded state to the folded state, the moveable plate 60 may move towards the base plate 101 of the shaft bracket 10, such that the accommodation space 100 may have enough space for accommodating the middle region 43 of the folded and deformed flexible panel 40. After the flexible panel 40 is folded, the middle region 43 may at least partly protrude into the accommodation space 100. When the foldable electronic device switches from the folded state to the unfolded state, the moveable plate 60 may move towards the flexible panel 40 and support the middle region 43 of the flexible panel 40. When the flexible panel 40 is in the unfolded state, the moveable plate 60 may be configured to support the middle region 43, therefore a display effect of the flexible panel 40 may be more stable. A general flexible panel 40 may include a touch-control structure with a touch operation function. If the middle region 43 of the flexible panel needs to be touched in the unfolded state, the flexible panel 40 will be prevented from shaking due to a support of the moveable plate 60.

The moveable plate 60 may include a first surface 601 facing the flexible panel 40 and a second surface 602 facing away from the flexible panel 40. The moveable plate 60 may further include a first end and a second end arranged along an axial direction of the shaft bracket 10. Mutually matched column/groove structures may be arranged on the two ends and the shaft bracket, such that the moveable plate 60 may move along a predefined trajectory when the first housing 20 and the second housing 30 are rotating, thereby realizing movement of the moveable plate towards the base plate 101 of the shaft bracket 10 or towards the middle region 43 of the flexible panel 40.

FIG. 6 to FIG. 10 illustrate a specific structure according to some embodiments. This specific structure may implement the movement of the moveable plate 60 relative to the shaft bracket 10 following a state switch process of the foldable electronic device.

Figure 6:
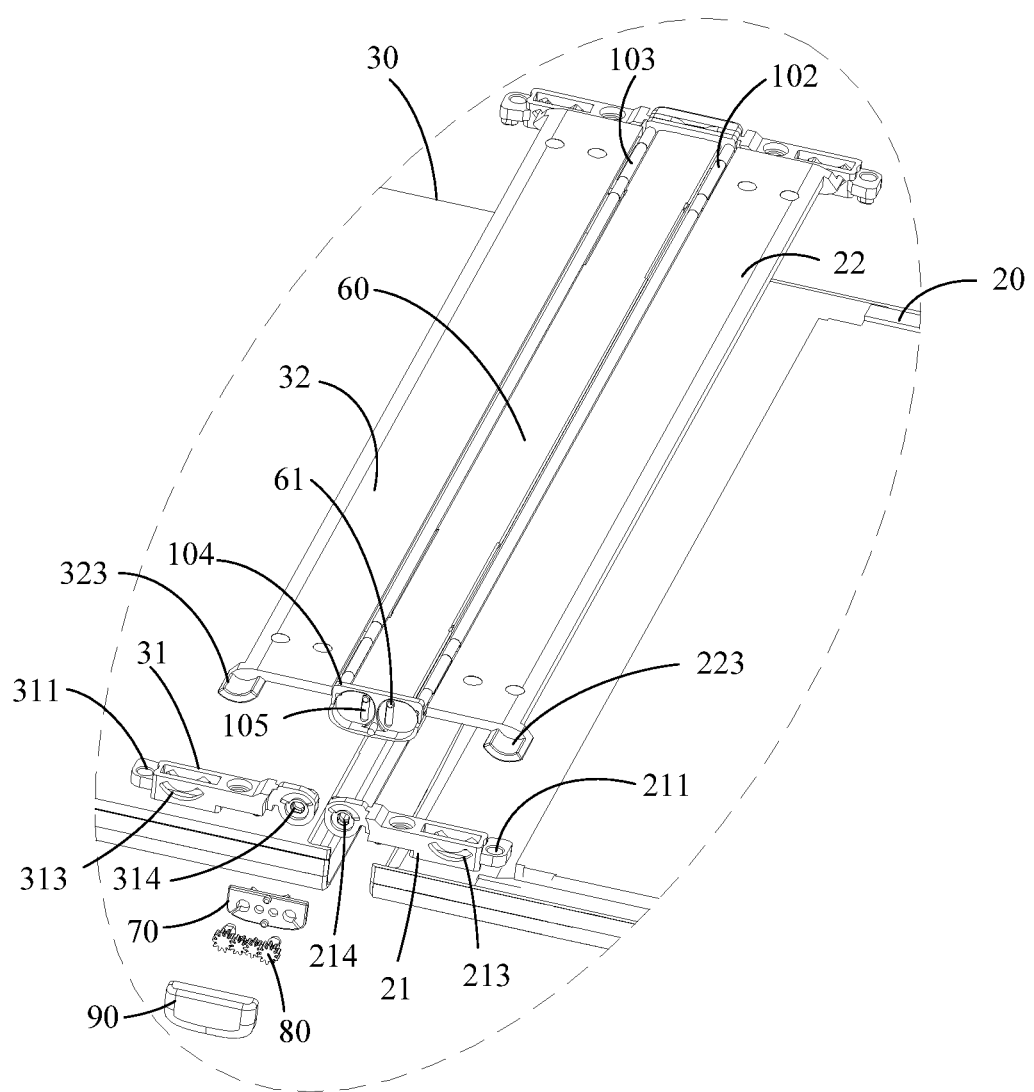
FIG. 6 is a schematic exploded diagram of a partial structure of a foldable electronic device when being in the unfolded state according to an embodiment of the present disclosure.
Figure 7:
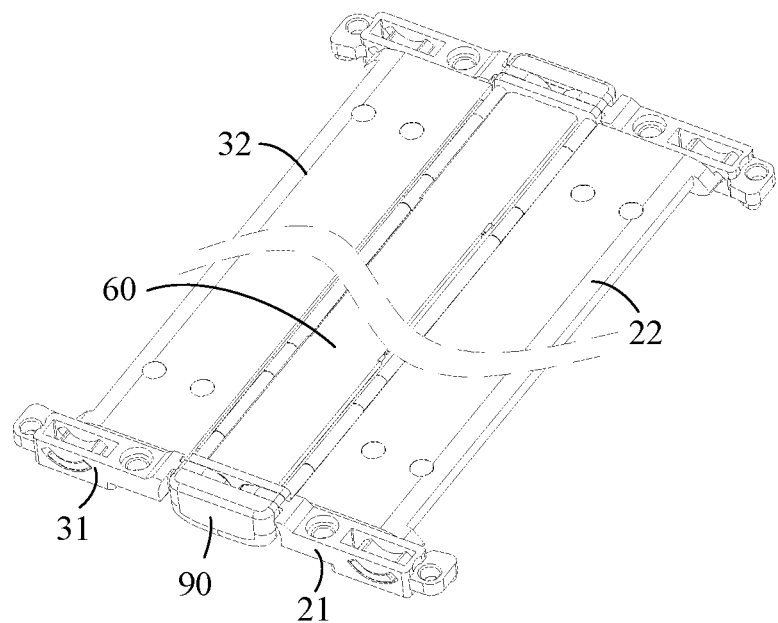
FIG. 7 is a schematic assembled diagram of a shaft bracket and corresponding members of a foldable electronic device when being in the unfolded state according to an embodiment of the present disclosure.
Figure 8:
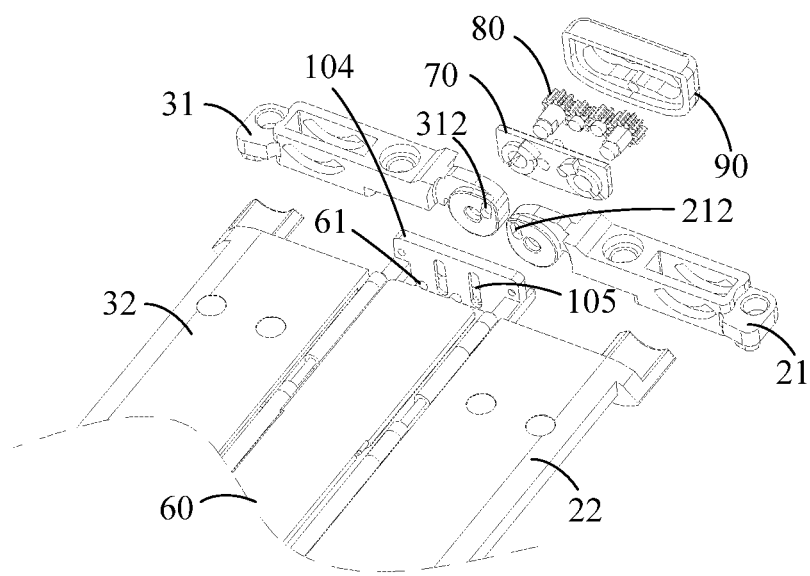
FIG. 8 is a schematic exploded diagram of the structure shown in FIG. 7.

As is shown in FIGS. 6, 7 and 8, a first rotating arm 21 may be fixedly arranged on the first housing 20. One end of the first rotating arm 21 may be rotatably connected to the shaft bracket 10, a mounting hole 211 may be defined on the other end of the first rotating arm 21. The other end of the first rotating arm 21 may be fixedly connected to the first housing 20 through a fastener such as a screw matching with the mounting hole 211. There may be two first rotating arms 21, respectively arranged on two ends of the shaft bracket 10. The first rotating arm 21 and the first housing 20 may simultaneously rotate around the shaft bracket 10.

Figure 9:
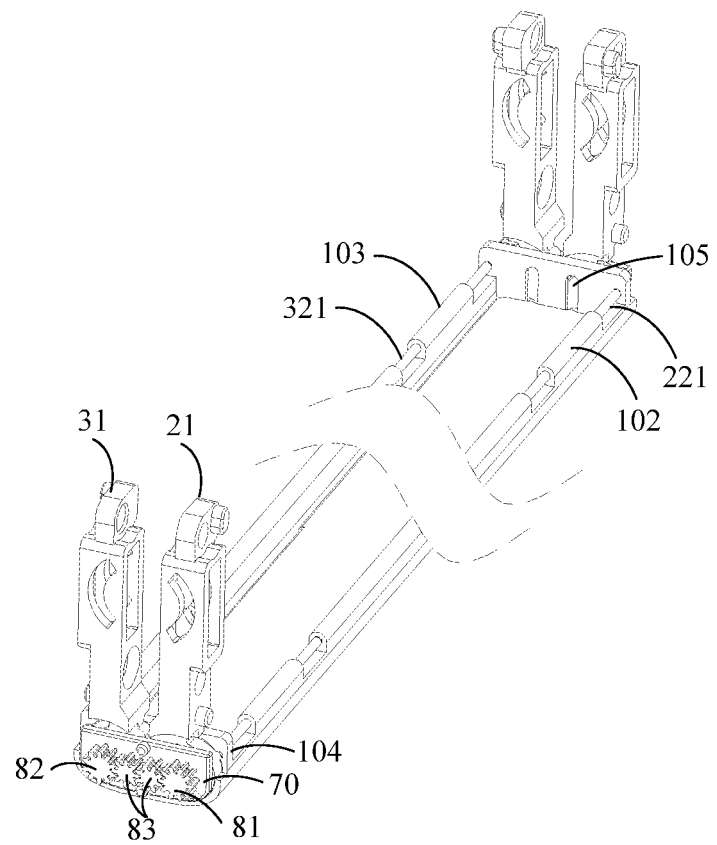
FIG. 9 is a schematic assembled diagram of a shaft bracket and corresponding members of a foldable electronic device when being in the folded state according to an embodiment of the present disclosure.
Figure 10:
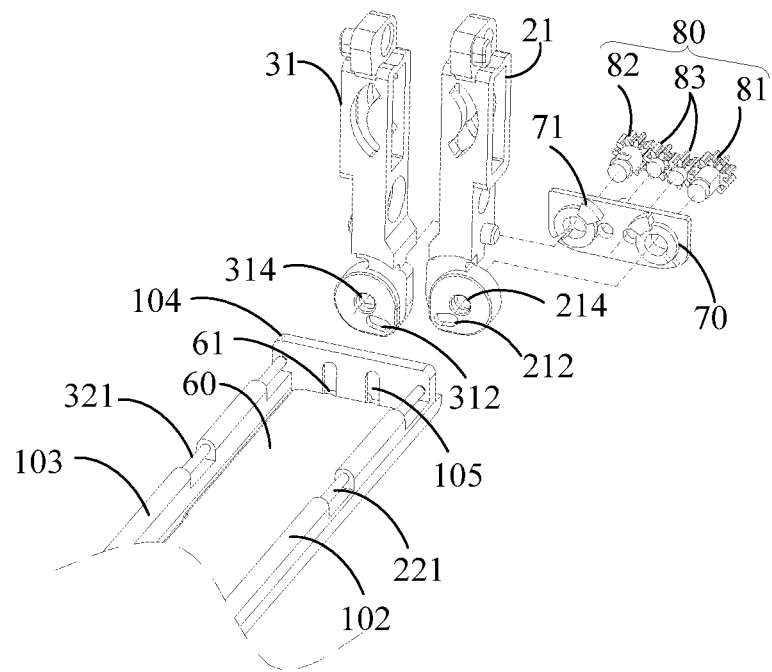
FIG. 10 is a schematic exploded diagram of the structure shown in FIG. 9.

More specifically, a first intermediate plate 22 may be arranged to be connected between the first housing 20 and the first side plate 102. As is shown in FIG. 9 and FIG. 10, a first hinge shaft 221 may be arranged on the first side plate 102. The first intermediate plate 22 may be hinged on the first hinge shaft 221. The first intermediate plate 22 may be configured to support the flexible panel 40 with other structures in the first housing 20. As is shown in FIG. 6, a tenon 223 and a groove 213 that cooperate with each other may also be provided between an end of the first intermediate plate 22 and the first rotating arm 21. The tenon 223 may be arranged on one of the first intermediate plate 22 and the first rotating arm 21. The groove 213 may be defined by the other one of the first intermediate plate 22 and the first rotating arm 21. As shown in FIG. 6, the tenon 223 may be provided on the end of the first intermediate plate 22, the groove 213 may be defined by the first rotating arm 21. A length of the groove 213 may be greater than a length of the tenon 223, such that when the first intermediate plate 22 switches between the unfolded state and the folded state, the tenon 223 could move in the groove, thus a variation of a dimension difference between an inner side and an outer side of the foldable electronic device may be satisfied. The variation of the dimension difference may be produced during the switching between the folded state and the unfolded state.

The second housing 30 may also be provided with similar arrangements. A second rotating arm 31 may be arranged on the second housing 30. One end of the second rotating arm 31 may be rotatably connected to the shaft bracket 10, the other end of the second rotating arm 21 may be provided with a mounting hole 311 and may be fixedly connected to the first housing 30 through a fastener such as a screw. There may be two second rotating arms 31, respectively arranged on two ends of the shaft bracket 10. The second rotating arm 31 and the second housing 30 may simultaneously rotate around the shaft bracket 10.

More specifically, a second intermediate plate 32 may be arranged to be connected between the second housing 30 and the second side plate 103. As is shown in FIG. 9 and FIG. 10, a second hinge shaft 321 may be arranged on the second side plate 103. The second intermediate plate 32 may be hinged on the second hinge shaft 321. The second intermediate plate 32 may be configured to support the flexible panel 40 with other structures in the second housing 30. As is shown in FIG. 6, a tenon 323 and a groove 313 that cooperate with each other may also be provided between an end of the second intermediate plate 32 and the second rotating arm 31. The tenon 323 may be arranged on one of the first intermediate plate 22 and the first rotating arm 31. The groove 313 may be defined by the other one of the first intermediate plate 22 and the first rotating arm 31. As shown in FIG. 6, the tenon 323 may be provided on the end of the first intermediate plate 22, the groove 313 may be defined by the first rotating arm 31. A length of the groove 313 may be greater than a length of the tenon 323, such that when the second intermediate plate 32 switches between the unfolded state and the folded state, the tenon 223 could move in the groove, thus a variation of a dimension difference between an inner side and an outer side of the foldable electronic device may be satisfied. The variation of the dimension difference may be produced during the switch between the folded state and the unfolded state.

An end of the moveable plate 60 may be provided with posts 61 that cooperates with the first rotating arm 21 and the second rotating arm 31. The moveable plate 60 may have a long strip shape, and dimensions of the moveable plate 60 may match with the accommodation space 100 in the shaft bracket 10. Thus the moveable plate 60 could be lifted and lowed in the accommodation space 100 without being hindered. Meanwhile, when the foldable electronic device is in the unfolded state, the moveable plate 60 may have a larger area for supporting the middle region 43 of the flexible panel 40. The posts 61 may extend from two ends of the moveable plate 60 along a length direction of the moveable plate 60, and pass through the first rotating arm 21 and the second rotating arm 31 respectively. Two posts 61 may be arranged on one end of the moveable plate 60. One post 61 may cooperate with the first rotating arm 21. The other post 61 may cooperate with the second rotating arm 31.

As is shown in FIG. 8 and FIG. 10, an offset groove 212 may be eccentrically defined on one end of the first rotating arm 21 that is rotatably connected to the shaft bracket 10. One of the posts 61 of the moveable plate 60 may pass through the offset groove 212. When the first rotating arm 21 is rotating, a biasing force may be applied on the post 61 by a groove wall of the offset groove 212, such that when the foldable electronic device switches from the unfolded state to the folded state, the moveable plate 60 may move towards the base plate 101 of the shaft bracket 10. Therefore, more space may be provided for a deformation of the middle region 43 of the flexible panel 40, thereby facilitating the middle region 43 of the flexible panel 40 to enter the accommodation space 100 of the shaft bracket 10. Also, when the foldable electronic device switches from the folded state to the unfolded state, the moveable plate 60 could move towards the flexible panel 40, and support the middle region 43 of the flexible panel 40.

Similarly, an offset groove 312 may be eccentrically defined on one end of the second rotating arm 31 that is rotatably connected to the shaft bracket 10. The other one of the posts 61 of the moveable plate 60 may pass through the offset groove 312. When the second rotating arm 31 is rotating, a biasing force may be applied on the post 61 by a groove wall of the offset groove 312, such that when the foldable electronic device switches from the unfolded state to the folded state, the moveable plate 60 may move towards the base plate 101 of the shaft bracket 10, more space may be provided for a deformation of the middle region 43 of the flexible panel 40, thereby facilitating the middle region 43 of the flexible panel 40 to enter the accommodation space 100 of the shaft bracket 10. Also, when the foldable electronic device switches from the folded state to the unfolded state, the moveable plate 60 could move towards the flexible panel 40, and support the middle region 43 of the flexible panel 40.

The offset groove 212 and the offset groove 312 may extend a certain length respectively. When the foldable electronic device switches between the unfolded state and the folded state, the posts 61 may be located at different positions in the offset groove 212 and the offset groove 312 respectively, to better match with rotating trajectories of the first rotating arm 21 and the second rotating arm 31. Therefore, a lifting and lowering of the moveable plate 60 relative to the base plate 101 may be realized more smoothly.

Further, the shaft bracket 10 may also include two end plates 104 arranged on two opposite ends of the base plate 101. Each of the end plates 104 may be connected to corresponding ends of the first side plate 102 and the second side plate 103. In this way, the shaft bracket 10 may be formed as a box with an opening by the base plate 101, the first side plate 102, the second side plate 103 and the two end plates 104. The enclosed space may be the accommodation space 100. A length of the accommodation space 100 extending along an axial direction of the shaft bracket 10 may be at least greater than a dimension of the flexible panel 40 along the same direction. It should be appreciated that, the first side plate 102 and the second side plate 103 may be hollowed out. The base plate 101 may be somewhat curved, thus a transition between the first housing 20 and the second housing 30 in the folded state may be smoother.

A guiding groove 105 may be defined on the end plate 104. A number of the guiding grooves 105 may be two. The two guiding grooves 105 and the two posts 61 may have a one-on-one correspondence. Each of the posts 61 of the moveable plate 60 may pass through a corresponding guiding groove 105 and then match with the first rotating arm 21 and the second rotating arm 31. In other words, the first rotating arm 21 and the second rotating arm 31 may be arranged outside the accommodation space 100 of the shaft bracket 10. By defining the guiding groove 105 on the end plate 104, movement of the moveable plate 60 may be guided and restricted by the guiding groove 105, thus it is ensured that the moveable plate 60 could only move relative to the base plate 101, thereby avoiding movement of the moveable plate 60 along other directions.

In some embodiments, as is shown in FIG. 6, the foldable electronic device may further include a fixing plate 70 and a gear train 80 arranged on the fixing plate 70. The fixing plate 70 may be arranged on the end plate 104. Ends of the first rotating arm 21 and the second rotating arm 31 that are rotatably connected to the shaft bracket 10 may be sandwiched between the fixing plate 70 and the end plate 104. As is shown in FIG. 10, the fixing plate 70 may be further provided with a stop block 71. The stop block 71 may be configured to limit a rotating range of the first rotating arm 21 and the second rotating arm 31. The stop block 71 may prevent the rotating range of the first rotating arm 21 and the second rotating arm 31 from being greater than a predetermined range, thereby avoiding rotation of the foldable electronic device outside a predetermined angle range. The stop block 71 may also be arranged on the end plate 104, as long as the stop block 71 could interference at a predefined location with the first rotating arm 21 and the second rotating arm 31 located between the fixing plate 70 and the end plate 104, thereby preventing the first rotating arm 21 and the second rotating arm 31 from rotating excessively.

The gear train 80 may be configured to connect the first rotating arm 21 and the second rotating arm 31 for a synchronous transmission between the first rotating arm 21 and the second rotating arm 31. By means of a transmission connection of the gear train 80, a rotation of the first rotating arm 21 relative to the shaft bracket 10 may drive the second rotating arm 31 to rotate relative to the shaft bracket 10. Similarly, a rotation of the second rotating arm 31 relative to the shaft bracket 10 may also drive the first rotating arm 21 to rotate relative to the shaft bracket 10.

As is shown in FIG. 9 and FIG. 10, the gear train 80 may include a first gear 81, a second gear 82 and an intermediate gear 83 meshing between the first gear 81 and the second gear 82. The fixing plate 70 may define through holes having one-on-one correspondence with and matching with the first gear 81, the second gear 82 and the intermediate gear 83. A gear shaft of the first gear 81 may pass through a corresponding through hole of the fixing plate 70 and then connect with the first rotating arm 21 for transmission. A gear shaft of the second gear 82 may pass through a corresponding through hole of the fixing plate 70 and then connect with the second rotating arm 31 for transmission. The gear shaft of the first gear 81 and the gear shaft of the second gear 82 may be square shafts. A corresponding mounting hole 214 may be defined on the first rotating arm 21. A corresponding mounting hole 314 may also be defined on the second rotating arm 31. The gear shaft of the first gear 81 may pass through the mounting hole 214 of the first rotating arm 21 and form a transmission connection with the first rotating arm 21, such that the first rotating arm 21 and the shaft bracket 10 may form a rotating connection through the gear train 80. Similarly, the gear shaft of the second gear 82 may pass through the mounting hole 314 of the second rotating arm 31 and form a transmission connection with the second rotating arm 31, such that the second rotating arm 31 and the shaft bracket 10 may form a rotating connection through the gear train 80. The number of the intermediate gear 83 may be one or two. When there is one intermediate gear 83, the rotation of the first rotating arm 21 and the second rotating arm 31 may take the gear shaft of the intermediate gear 83 as the symmetry axis. When there are two intermediate gears 83, the rotation of the first rotating arm 21 and the second rotating arm 31 may take a center line between the two intermediate gears 83 as the symmetry axis.

In the embodiments shown in FIG. 6 to FIG. 10, the rotating axes of the first rotating arm 21 and the second rotating arm 31 may be the corresponding gear shafts. While the rotation axes of the first intermediate plate 31 and the second intermediate plate 32 may be the corresponding hinge shafts. That is to say, the rotating axis of the first rotating arm 21 and the rotating axis of the first intermediate plate 31 may not be a same axis. The rotating axis of the second rotating arm 31 and the rotating axis of the second intermediate plate 32 may not be a same axis. Further by defining the grooves 213, 313 of relative larger size on the first rotating arm 21 and the second rotating arm 31, a certain space for relative movement of the first intermediate plate 22 and the second intermediate plate 32 may be defined in the grooves 213, 313, thereby a variation of a dimension difference between the inner side and outer side of the foldable electronic device may be accommodated. The variation of the dimension difference may be produced during a switch process between the folded state and the unfolded state.

As is shown in FIG. 6, a decorative cover 90 may also be arranged at an end of the shaft bracket 10. The decorative cover 90 may join with the fixing plate 70 to cover the gear train 80.

Since the flexible panel 40 could be bent and deformed without affecting its display performance, when the first housing 20 and the second housing 30 rotate around the shaft bracket 10, the flexible panel 40 could move with the movement of the first housing 20 and the second housing 30 to switch between the folded state and the unfolded state. When the foldable electronic device is in a folded state, the flexible panel 40 may be hidden inside the foldable electronic device. The front surface 401 of the flexible panel 40 may be bent into two parts that are close to each other. The middle region 43 of the flexible panel 40 may be accommodated in the accommodation space 100 in an inner side 101 of the shaft bracket 10. In the initial stage of a process during which the flexible panel 40 switches from the unfolded state with a planar form to the folded state, since the middle region 43 is not fixed relative to the first housing 20 and the second housing 30, due to an accidental external force, the bending deformation of the middle region 43 may be toward the shaft bracket 10 (concave) or away from the shaft bracket (convex). Obviously, the convex deformation is undesirable, which may damage the flexible panel 40. The guiding member 50 provided in some embodiments may be configured to provide a force for driving the middle region 43 of the flexible panel 40 towards the accommodation space 100 of the shaft bracket 10. Thus in the initial stage of a process during which the flexible panel 40 switches from the unfolded state with a planar form to the folded state, the flexible panel 40 has to deform toward the shaft bracket 10 due to a force provided by the guiding member 50 to the flexible panel 40. Therefore, unintended deformation of the flexible panel 40, such as deformation away from the shaft bracket 10 may be prevented, thus a normal switch of the state of the flexible panel 40 may be assured.

Figure 11:
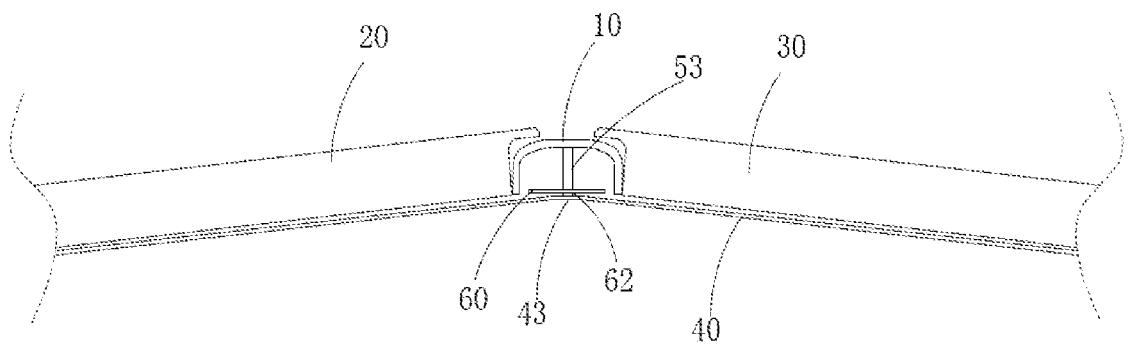
FIG. 11 is a schematic structural diagram of a foldable electronic device.

Referring to FIG. 11, the guiding member 50 may include an elastic member 53. One end of the elastic member 53 may be connected to the shaft bracket 10, the other end of the elastic member 53 may be connected to the middle region 43 of the flexible panel 40. The elastic member 53 may generate a pulling force that causes the flexible panel 40 to move towards the base plate 101 of the shaft bracket 10. A material of the elastic member 53 may be metal or plastic. Two ends of the elastic member 53 may be fixed relative to the flexible panel 40 and the shaft bracket 10 by means of adhesive bonding. Through the pulling force towards the base plate 101 provided by the elastic member, the flexible panel 40 may always have a trend to move towards the base plate 101. Thus during the process the foldable electronic device switches from the unfolded state to the folded state, for example, during the process the foldable electronic device rotates along a direction indicated by an arrow shown in FIG. 1, initial movement trend of the flexible panel 40 may be assured, the flexible panel 40 could not convexly arch away from the base plate 101 unintentionally, thereby assuring a smooth switch from the unfolded state to the folded state, and preventing damage to the flexible panel.

Referring to FIG. 11, in the presence of the moveable plate 60, a passage 62 may be defined on the moveable plate 60 for the elastic member 53 to pass through. The passage 62 may be a through hole defined on the moveable plate 60, or a notch defined on an edge of the moveable plate 60.

In some embodiments, as is shown in FIG. 1 and FIG. 2, the guiding member 50 may include a magnetic attraction member 51 and a magnetic member 52. The magnetic attraction member 51 and the magnetic member 52 may be attractive to each other. One of the magnetic attraction member 51 and the magnetic member 52 may be any kinds of magnet. The other one of the magnetic attraction member 51 and the magnetic member 52 may be a material such as an iron sheet or a ferromagnetic metal piece that could be attracted by a magnet force generated by the magnet. The magnetic attraction member 51 may be arranged on the shaft bracket 10. The magnetic member 52 may be arranged on the middle region 43 of the flexible panel 40. In some embodiments, arrangement position of the magnetic attraction member 51 and the magnetic member 52 may be interchanged.

In some concrete embodiments, as is shown in FIG. 2, the magnetic attraction member 51 may be arranged on a bottom of the accommodation space 100 of the shaft bracket 10. The magnetic member 52 may be arranged on the back surface 402 of the middle region 43 of the flexible panel 40.

In some embodiments with the moveable plate 60, as is shown in FIG. 5, the magnetic attraction member 51 may be arranged on the moveable plate 60, the magnetic member 52 may be arranged on the middle region 43 of the flexible panel 40. It should be appreciated that, the arrangement positions of the two may be interchanged. In some specific embodiments, as is shown in FIG. 5, the magnetic attraction member 51 may be arranged on a second surface 602 of the moveable plate 60, the magnetic member 52 may be arranged on the back surface 402 of the middle region 43 of the flexible panel 40.

Since the magnetic attraction force generated by mutual attraction between the magnetic attraction member 51 and the magnetic member 52 may make the flexible panel 40 to have a trend to move towards the base plate 101, thus during the process the foldable electronic device switches from the unfolded state to the folded state, for example, during the process the foldable electronic device rotates along the direction indicated in FIG. 4, an initial movement trend of the flexible panel 40 may be assured. Unintentional convex arch along the direction away from the base plate 101 may not occur, thereby assuring the smooth switch from the unfolded state to the folded state, and preventing a damage to the flexible panel 40.

Technical features of the above-mentioned embodiments could be combined arbitrarily. In order to make the description concise, not all possible combinations of the various technical features in the above-mentioned embodiments are described. However, as long as there is no contradiction in the combinations of these technical features, all should be considered to be within the scope of the specification.

The above mentioned embodiments only express a few implementations of the present disclosure, the description thereof is relatively specific and detailed, but they could not be construed as a limitation on the scope of the patent application. It should be pointed out that, for those of ordinary skills in the art, without departing from the concept of this application, several modifications and improvements could be made, and these all fall within the protection scope of the present disclosure. Therefore, the protection scope of this patent application should be subject to the appended claims.

What is claimed is:

1. A foldable electronic device, comprising:
   a shaft bracket, comprising a base plate, a first side plate and a second side plate, wherein the first side plate is connected to one side of the base plate, the second side plate is connected to another side of the base plate and opposite to the first side plate, the base plate, the first side plate and the second side plate define an accommodation space;
   a first housing and a second housing, the first housing being rotatably connected to the first side plate, the second housing being rotatably connected to the second side plate, wherein the first housing and the second housing are capable of rotating around the shaft bracket between an unfolded state and a folded state;
   a flexible panel, comprising a first region, a middle region and a second region integrated together, the first region being coupled with the first housing, the second region being coupled with the second housing, and the middle region being arranged corresponding to the base plate of the shaft bracket; and
   a guiding member, arranged between the middle region of the flexible panel and the shaft bracket, and configured to apply a guiding force towards the accommodation space of the shaft bracket to the middle region of the flexible panel.

2. The foldable electronic device according to claim 1, wherein the guiding member comprises an elastic member, one end of the elastic member is connected to the shaft bracket, another end of the elastic member is connected to the middle region of the flexible panel, the elastic member is configured to generate a pulling force that causes the flexible panel to move towards the accommodation space of the shaft bracket.

3. The foldable electronic device according to claim 1, wherein the guiding member comprises a magnetic attraction member and a magnetic member, the magnetic attraction member is arranged on one of the middle region of the flexible panel and the shaft bracket, the magnetic member is arranged on the other one of the middle region of the flexible panel and the shaft bracket.

4. The foldable electronic device according to claim 3, wherein the magnetic attraction member is arranged on a bottom of the accommodation space of the shaft bracket, the magnetic member is arranged on a back surface of the middle region of the flexible panel.

5. The foldable electronic device according to claim 1, further comprising:
   a moveable plate connected to the shaft bracket, wherein the moveable plate is arranged in the accommodation space, when the foldable electronic device switches from the unfolded state to the folded state, the moveable plate is configured to move towards the base plate of the shaft bracket, when the foldable electronic device switches from the folded state to the unfolded state, the moveable plate is configured to move towards the flexible panel and is configured to support the middle region of the flexible panel.

6. The foldable electronic device according to claim 5, wherein the guiding member comprises an elastic member, one end of the elastic member is connected to the shaft bracket, another end of the elastic member is connected to the middle region of the flexible panel, the elastic member is configured to generate a pulling force that causes the flexible panel to move towards the accommodation space of the shaft bracket, a passage is defined in the moveable plate for the elastic member to pass through.

7. The foldable electronic device according to claim 5, wherein the moveable plate comprises a first surface facing the flexible panel and a second surface facing away from the flexible panel, the guiding member comprises a magnetic attraction member and a magnetic member, the magnetic attraction member is arranged on the second surface of the moveable plate, the magnetic member is arranged on a back surface of the middle region of the flexible panel.

8. The foldable electronic device according to claim 5, wherein two posts are arranged on an end of the moveable plate, a first rotating arm matching with one of the two posts is arranged on the first housing, a second rotating arm matching with the other one of the two posts is arranged on the second housing, when the foldable electronic device switches from the unfolded state to the folded state, the first rotating arm and the second rotating arm are configured to drive the moveable plate to move towards the base plate of the shaft bracket, when the foldable electronic device switches from the folded state to the unfolded state, the first rotating arm and the second rotating arm are configured to drive the moveable plate to move towards the flexible panel, and are configured to support the middle region of the flexible panel.

9. The foldable electronic device according to claim 8, wherein the shaft bracket further comprises two end plates connecting at two opposite ends of the base plate respectively, each of the two end plates defines two guiding grooves, one of the two posts passes through one of the two guiding grooves and then matches with the first rotating arm, the other one of the two posts passes through the other one of the two guiding grooves and then matches with the second rotating arm.

10. The foldable electronic device according to claim 9, further comprising:
a fixing plate and a gear train arranged on the fixing plate, wherein the fixing plate is arranged on one of the two end plates, the first rotating arm and the second rotating arm are located between the fixing plate and the end plate provided with the fixing plate; the gear train comprises a first gear, a second gear and an intermediate gear meshing between the first and the second gear, a gear shaft of the first gear passes through the fixing plate and then is connected to the first rotating arm for transmission, a gear shaft of the second gear passes through the fixing plate and then is connected to the second rotating arm for transmission.

11. The foldable electronic device according to claim 10, further comprising:
a stop block, arranged on the fixing plate and configured to limit a rotating range of the first rotating arm and the second rotating arm.

12. The foldable electronic device according to claim 8, wherein the shaft bracket further comprises a first intermediate plate and a second intermediate plate;
one end of the first intermediate plate is hinged to the first side plate, the other end of the first intermediate plate is connected to the first rotating arm;
one end of the second intermediate plate is hinged to the second side plate, the other end of the second intermediate plate is connected to the second rotating arm.

13. The foldable electronic device according to claim 12, wherein a first tenon is arranged on one of the first intermediate plate and the first rotating arm, a first groove is defined by the other one of the first intermediate plate and the first rotating arm, the first intermediate plate and the first rotating arm are connected to each other through a cooperation of the first tenon and the first groove; a second tenon is arranged on one of the second intermediate plate and the second rotating arm, a second groove is defined by the other one of the second intermediate plate and the second rotating arm, the second intermediate plate and the second rotating arm are connected to each other through a cooperation of the second tenon and the second groove.

14. A foldable electronic device, comprising:
a shaft bracket, defining an accommodation space;
a housing assembly, comprising a first housing and a second housing, wherein both the first housing and the second housing are connected to the shaft bracket, and configured to rotate relative to the shaft bracket to switch between an unfolded state and a folded state;
a flexible panel, comprising a first region, a middle region and a second region integrated together, wherein the middle region is located between the first region and the second region, the first region is connected to the first housing, the second region is connected to the second housing; and
a guiding member, arranged between the middle region of the flexible panel and the shaft bracket, configured to apply a guiding force towards the accommodation space of the shaft bracket to the middle region of the flexible panel.

15. The foldable electronic device according to claim 14, wherein the guiding member comprises an elastic member, an end of the elastic member is connected to the shaft bracket, another end of the elastic member is connected to the middle region, the elastic member is configured to generate a pulling force to drive the flexible panel to move towards the accommodation space, the foldable electronic device further comprises a moveable plate, wherein the moveable plate is arranged in the accommodation space and connected to the shaft bracket, when the foldable electronic device switches from the unfolded state to the folded state, the moveable plate is configured to move in the accommodation space along an direction away from the middle region, when the foldable electronic device switches from the folded state to the unfolded state, the moveable plate is configured to move in the accommodation space along a direction towards the middle region and is configured to support the middle region.

16. The foldable electronic device according to claim 15, wherein two posts are arranged on one end of the moveable plate, a first rotating arm matching with one of the two posts is arranged on the first housing, a second rotating arm matching with the other one of the two posts is arranged on the second housing, when the foldable electronic device switches from the unfolded state to the folded state, the first rotating arm and the second rotating arm are configured to drive the moveable plate to move along a direction away from the middle region, when the foldable electronic device switches from the folded state to the unfolded state, the first rotating arm and the second rotating arm are configured to drive the moveable plate to move along a direction towards the middle region, and are configured to support the middle region.

17. The foldable electronic device according to claim 14, further comprising:
a moveable plate, wherein the moveable plate is arranged in the accommodation space and connected to the shaft bracket, when the foldable electronic device switches from the unfolded state to the folded state, the moveable plate is configured to move in the accommodation space along an direction away from the middle region, when the foldable electronic device switches from the folded state to the unfolded state, the moveable plate is configured to move in the accommodation space along a direction towards the middle region and is configured to support the middle region; the guiding member comprises a magnetic attraction member and a magnetic member, the magnetic attraction member is arranged on one of the moveable plate and the middle region, the magnetic member is arranged on the other one of the moveable plate and the middle region.

18. The foldable electronic device according to claim 17, wherein two posts are arranged on one end of the moveable plate, a first rotating arm matching with one of the two posts is arranged on the first housing, a second rotating arm matching with the other one of the two posts is arranged on the second housing, when the foldable electronic device switches from the unfolded state to the folded state, the first rotating arm and the second rotating arm are configured to drive the moveable plate to move along a direction away from the middle region, when the foldable electronic device switches from the folded state to the unfolded state, the first rotating arm and the second rotating arm are configured to drive the moveable plate to move along a direction towards the middle region, and are configured to support the middle region.

19. The foldable electronic device according to claim 18, wherein the shaft bracket further comprises two end plates arranged on two opposite ends of the shaft bracket respectively, each of the two end plates defines two guiding grooves, one of the two posts passes through one of the two guiding grooves and matches with the first rotating arm, the other one of the two posts passes through the other one of the two guiding grooves and then matches with the second rotating arm.

20. A foldable electronic device, comprising:
- a shaft bracket, defining an accommodation space;
- a first housing and a second housing, wherein both the first housing and the second housing are connected to the shaft bracket, and capable of rotating relative to the shaft bracket to switch between an unfolded state and a folded state;
- a flexible panel, comprising a first region, a middle region and a second region integrated together, wherein the middle region is located between the first region and the second region, the first region is connected to the first housing, the second region is connected to the second housing;
- a moveable plate arranged in the accommodation space and connected to the shaft bracket, when the foldable electronic device switches from the unfolded state to the folded state, the moveable plate is configured to move in the accommodation space along an direction away from the middle region, when the foldable electronic device switches from the folded state to the unfolded state, the moveable plate is configured to move in the accommodation space along a direction towards the middle region and support the middle region; and
- a guiding member, comprising a magnetic attraction member and a magnetic member, wherein the magnetic attraction member is arranged on one of the moveable plate and the middle region, the magnetic member is arranged on the other one of the moveable plate and the middle region;

wherein the magnetic attraction member and the magnetic member are configured to be attracted to each other to connect the middle region and the moveable plate, and the middle region is capable of moving with a movement of the moveable plate.

\* \* \* \* \*